US009021251B2

(12) United States Patent
Chawla et al.

(10) Patent No.: US 9,021,251 B2
(45) Date of Patent: Apr. 28, 2015

(54) METHODS, SYSTEMS, AND COMPUTER PROGRAM PRODUCTS FOR PROVIDING A VIRTUAL PRIVATE GATEWAY BETWEEN USER DEVICES AND VARIOUS NETWORKS

(75) Inventors: Deepak Chawla, Ocean, NJ (US); William R. Beckett, III, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1121 days.

(21) Appl. No.: 12/610,746

(22) Filed: Nov. 2, 2009

(65) Prior Publication Data

US 2011/0107413 A1    May 5, 2011

(51) Int. Cl.
*H04L 29/06* (2006.01)
*H04L 12/725* (2013.01)

(52) U.S. Cl.
CPC ............ *H04L 63/0227* (2013.01); *H04L 45/30* (2013.01)

(58) Field of Classification Search
None
See application file for complete search history.

(56) References Cited

U.S. PATENT DOCUMENTS

| | | | | |
|---|---|---|---|---|
| 6,185,680 | B1 * | 2/2001 | Shimbo et al. | 713/160 |
| 6,324,648 | B1 * | 11/2001 | Grantges, Jr. | 726/12 |
| 7,290,132 | B2 * | 10/2007 | Aboba et al. | 713/153 |
| 7,757,074 | B2 * | 7/2010 | Sundarrajan et al. | 713/151 |
| 8,094,810 | B2 * | 1/2012 | Hohenberger et al. | 380/28 |
| 2002/0184527 | A1 * | 12/2002 | Chun et al. | 713/201 |
| 2003/0145228 | A1 * | 7/2003 | Suuronen et al. | 713/201 |
| 2006/0059370 | A1 * | 3/2006 | Asnis et al. | 713/189 |
| 2008/0072033 | A1 * | 3/2008 | McAlister | 713/153 |

OTHER PUBLICATIONS

Doraswamy et al., IPSec—The New Security Standard for the Internet, Intranets, and Virtual Private Networks, 2003, $2^{nd}$ Edition, pp. 167-176.*

Doraswamy et al., IPSec—The New Security Standard for the Internet, Intranets, and Virtual Private Networks, 2003, Prentice Hall, $2^{nd}$ Edition, pp. 167-176.*

* cited by examiner

*Primary Examiner* — Minh Dinh
(74) *Attorney, Agent, or Firm* — Myers Bigel Sibley & Sajovec, PA (57) ABSTRACT

A communication network is operated by receiving traffic from a user device at a gateway device associated with a gateway service provider, which manages gateways to both secure and insecure networks. The gateway uses security policies to determine if traffic is destined to the secure or insecure network and applies appropriate policies which cause the traffic to be routed, dropped, or analyzed.

15 Claims, 4 Drawing Sheets

FIG. 4 ions, the method further comprises, and more particularly, to methods, systems, and computer program products for managing communication traffic between user devices and various networks by establishing a Virtual Private Gateway (VPG) between the user devices and various networks. These networks can be insecure such as the Internet, or secure such as an Enterprise network. Efficiency and security of a communication network may be improved by managing traffic via security policies.

METHODS, SYSTEMS, AND COMPUTER PROGRAM PRODUCTS FOR PROVIDING A VIRTUAL PRIVATE GATEWAY BETWEEN USER DEVICES AND VARIOUS NETWORKS

BACKGROUND OF THE INVENTION

The present application relates generally to communication networks, and, more particularly, to methods, systems, and computer program products for managing communication traffic between user devices and various networks by establishing a Virtual Private Gateway (VPG) between the user devices and various networks. These networks can be insecure such as the Internet, or secure such as an Enterprise network. Efficiency and security of a communication network may be improved by managing traffic via security policies.

It is not uncommon for mobile workers to connect to their secure network with different devices either to get email or access enterprise applications, such as Customer Relationship Management (CRM). Devices may vary from laptops using cable modems (wireline), laptops using wireless PC cards (wireless) to smart mobile devices, such as iPhones and Blackberries. Typically, enterprises are required to balance the needs of security and the flexibility of remote access demanded by mobile workers.

A basic security challenge is to develop a technology platform to protect all Internet Protocol (IP) communications between the employee and the secure enterprise network. Typically, enterprises have turned to IP Sec based Virtual Private Network (VPN) solutions to secure traffic between employees and the enterprise This solution is valuable, but may lead to inefficient bandwidth utilization and potential scalability problems. The system described hereafter takes advantage of the security features of an IP Sec based VPN access solution, but also introduces mechanisms to improve efficiency and scalability of the gateway system.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments, a communication network is operated by receiving traffic from a user device at a gateway device associated with a gateway service provider, applying at least one traffic policy to the received traffic at the gateway device, the at least one traffic policy being associated with a secure network, determining if the traffic is destined for the secure network, and routing the traffic to the secure network using a security protocol associated with the secure network responsive to determining that the traffic is destined for the secure network.

In other embodiments, the method further comprises decrypting the traffic using a first cryptographic technique responsive to receiving the traffic. Routing the traffic to the secure network comprises encrypting the traffic using a second cryptographic technique.

In still other embodiment, the first cryptographic technique is public-key decryption using keys associated with the gateway service provider and the second cryptographic technique is public key encryption using keys associated with the secure network.

In still other embodiments, the method further comprises decrypting the traffic using a first cryptographic technique responsive to receiving the traffic. Routing the traffic to the secure network comprises encapsulating the traffic.

In still other embodiments, the first cryptographic technique is public-key decryption using keys associated with the gateway service provider.

In still other embodiments, the at least one traffic policy comprises a security policy In still other embodiments, the method further comprises assembling packets comprising the traffic into a session and applying at least one session policy to the assembled packets, the at least one session policy being associated with the application layer protocol level.

In still other embodiments, the method further comprises decrypting the traffic responsive to receiving the traffic and routing the traffic to a destination without passing through the secure network responsive to determining that the traffic is not destined for the secure network.

In still other embodiments, the method further comprises receiving traffic destined for the user device at the gateway device, determining if the received traffic destined for the user device is secure traffic, removing security from the received traffic destined for the user device responsive to determining that the received traffic destined for the user device is secure, applying at least one traffic policy to the received traffic destined for the user device at the gateway device and routing the received traffic destined for the user device to the user device using a security protocol associated with the user device.

In still other embodiments, removing security from the received traffic destined for the user device comprises determining if the received traffic destined for the user device is encrypted and decrypting the received traffic destined for the user device via public key encryption using keys associated with the secure network responsive to determining that the received traffic destined for the user device is encrypted.

In still other embodiments, removing security from the received traffic destined for the user device comprises removing encapsulation from the received traffic destined for the user device responsive to determining that the received traffic destined for the user device is not encrypted.

In still other embodiments, the method further comprises assembling packets comprising the received traffic destined for the user into a session and applying at least one session policy to the assembled packets, the at least one session policy being associated with the application layer protocol level.

In still other embodiments, the security protocol associated with the user device is public key encryption using keys associated with the gateway service provider.

In further embodiments, a switching apparatus comprises a processor that is configured to receive traffic from a user device at a gateway device associated with a gateway service provider, apply at least one traffic policy to the received traffic at the gateway device, the at least one traffic policy being associated with an secure network, determine if the traffic is destined for the secure network, and route the traffic to the secure network using a security protocol associated with the secure network responsive to determining that the traffic is destined for the secure network.

In still further embodiments, the processor is further configured to decrypt the traffic using a first cryptographic technique responsive to receiving the traffic and route the traffic to the secure network by encrypting the traffic using a second cryptographic technique.

In still further embodiments, the processor is further configured to decrypt the traffic using a first cryptographic technique responsive to receiving the traffic and route the traffic to the secure network by encapsulating the traffic.

In still further embodiments, the processor is further configured to assemble packets comprising the traffic into a session and apply at least one session policy to the assembled packets, the at least one session policy being associated with the application layer protocol level.

In still further embodiments, the processor is further configured to decrypt the traffic responsive to receiving the traffic and route the traffic to a destination without passing through the secure network responsive to determining that the traffic is not destined for the secure network.

In still further embodiments, the processor is further configured to receive traffic destined for the user device at the gateway device, determine if the received traffic destined for the user device is secure traffic, remove security from the received traffic destined for the user device responsive to determining that the received traffic destined for the user device is secure, apply at least one traffic policy to the received traffic destined for the user device at the gateway device, and route the received traffic destined for the user device to the user device using a security protocol associated with the user device.

In still other embodiments, a computer program product for operating a communication network comprises a computer readable storage medium having computer readable program code embodied therein. The computer readable program code comprises computer readable program code configured to receive traffic from a user device at a gateway device associated with a gateway service provider, computer readable program code configured to apply at least one traffic policy to the received traffic at the gateway device, the at least one traffic policy being associated with an secure network, computer readable program code configured to determine if the traffic is destined for the secure network, and computer readable program code configured to route the traffic to the secure network using a security protocol associated with the secure network responsive to determining that the traffic is destined for the secure network Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electro-magnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments are based on the idea that a network based element, such as a router, may be used to manage communication between user devices and a secure network. The network based element may reside in a service provider network and may be managed by a third party. Because the network router manages communication between the user devices and the secure network, the secure network need not provide a dedicated Virtual Private Network (VPN) between user devices (e.g., user devices associated with secure network) and the secure network. In some embodiments, the network element makes use of security techniques, such as encryption techniques, VPNs, and the like, used in the user devices and/or the secure network. The network element may translate between the security technique used by the secure network and the security technique used by the user devices. In other embodiments, the network element may implement security policies on behalf of the secure network. For example, the secure network may have a policy in which only certain employees have access to Human Resources information. The network element may block access to certain Internet Protocol (IP) addresses, Uniform Resource Locator (URL) addresses, queries from unauthorized user devices, and the like without the need for the secure network to enforce such limitations. The network element may also divert communication traffic from user devices that is not destined for the secure network so that the secure network is not burdened with hairpinning such traffic in and out of the secure network and on to its intended destination. According to some embodiments, a third party service provider may provide a service to enterprise customers that allows users to access the secure network of the customer using a wide variety of computing devices, smart phones, terminals, and the like.

Figure 1:
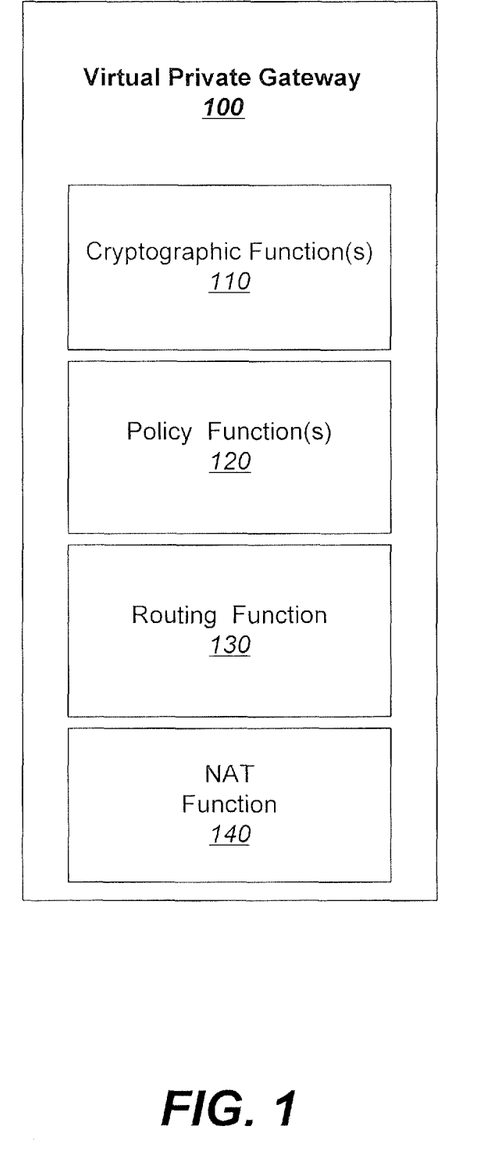
FIG. 1 is a block diagram that illustrates functional components of a Virtual Private Gateway (VPG) device in accordance with some embodiments.

Referring now to FIG. 1, a functional block diagram that illustrates a Virtual Private Gateway (VPG) switching device 100, according to some embodiments, will now be described. The VPG device 100 comprises a cryptographic function(s) module 110, a policy function(s) module 120, a routing function module 130, and a Network Address Translation (NAT) function module 140. The cryptographic function(s) module 110 is operable to provide an interface between the security techniques associated with user devices and the security techniques associated with a secure network(s). For example, the cryptographic function(s) module 110 may effectively translate between an encryption system used by user devices and an encryption system used by a secure network(s). The policy function(s) module 120 is operable to apply one or more policies to the communication traffic received, for example, from user devices. The traffic policies may be associated with the secure network(s) and the VPG device 100 may relieve the secure network(s) of the need to enforce such policies. Such policies may include, but are not limited to security policies and, for traffic that is part of a communication session and is processed by a stateful processor, may include policies that are applied to packets, for example, at the layer three (network layer) and/or layer four (transport layer) levels. The routing function module 130 is operable to route traffic in and out of the service provider core network. In some embodiments, the routing function module 130 is configured to determine if communication traffic from the user devices is destined for a system/network outside of the secure network(s), e.g., an unsecure network, such as the Internet at large. In this case, the routing function module 130 may route such traffic to its final destination without passing through the secure network(s), thus relieving the secure network(s) of the processing burden of redirecting the traffic to its intended destination. The Network Address Translation (NAT) function module 140 is operable to modify address information in packet headers so as to be able to re-map from one address space to another.

Although FIG. 1 illustrates exemplary hardware/software architectures that may be used in network elements, such as the VPG device 100 of FIG. 1, it will be understood that the present invention is not limited to such a configuration but is intended to encompass any configuration capable of carrying out operations described herein. Moreover, the functionality of the VPG device 100 of FIG. 1 may be implemented as a single processor system, a multi-processor system, or even a network of stand-alone computer systems, in accordance with various embodiments. The processor or processors may be implemented as any machine, including router(s), server(s), etc.

Figure 2:
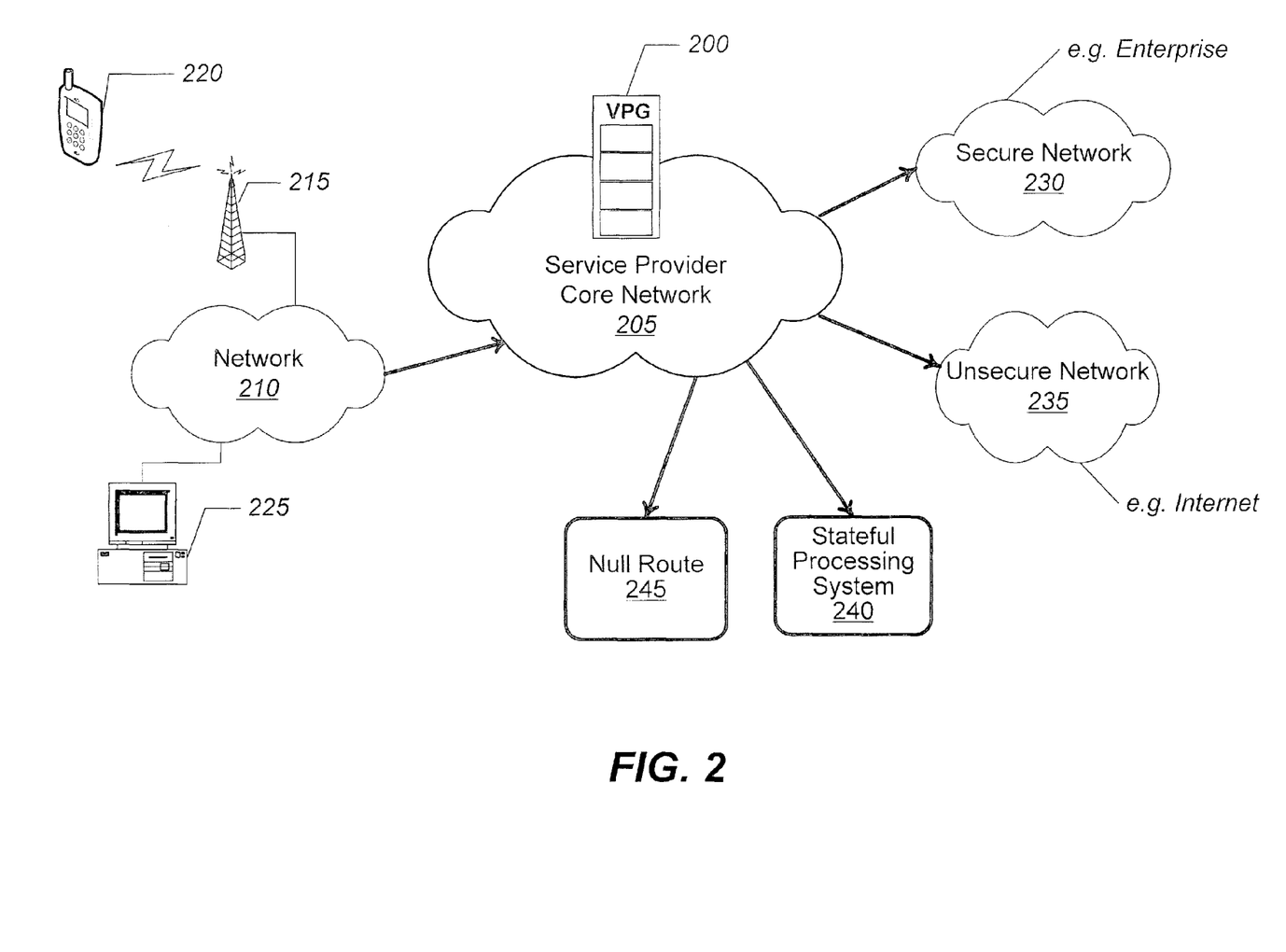
FIG. 2 is a block diagram of a communication network that includes a VPG device according to some embodiments.

Referring now to FIG. 2, an exemplary communication network that includes a VPG device 200 for managing communication traffic between user devices and a secure network, according to some embodiments, will now be described. The communication network comprises a network 210 that couples one or more user devices 220 and 225 to a service provider core network 205. The network 210 comprises a wireless base station transceiver 215 that may facilitate wireless communication with the wireless phone or mobile terminal 220. Thus, the user devices 220 and 225 may encompass both wireless and wireline devices.

As used herein, the terms "wireless phone" or "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a conventional laptop; a palmtop receiver or other appliance that includes a radiotelephone transceiver; and/or a portable media player, such as a MP3 player, iPod, or the like. Wireless phones and or mobile terminals may also be referred to as "pervasive computing" devices.

The service provider core network 205 couples the network 210 to a secure network 230 for accessing, for example, one or more secure networks and also to an unsecure network 235 for accessing one or more systems outside of the secure network, such as in the Internet at large. The service provider core network 205 comprises a VPG device 200, which may be configured as described above with respect to FIG. 1 to manage communication traffic between user devices 220 and 225 and the secure network 230 and unsecure network 235.

In some embodiments, the VPG device 200 along with the service provider core network 205 may be owned, managed, and/or controlled by a third party service provider distinct from the enterprise associated with the secure network 230.

The networks 205, 210, 230, and 235 may represent a global network, such as the Internet, or other publicly accessible network. The networks 205, 210, 230, and 235 may also, however, represent a wide area network, a local area network, an Intranet, or other private network, which may not accessible by the general public. Furthermore, the networks 205, 210, 230, and 235 may represent a combination of public and private networks or a VPN. Moreover, the embodiments described herein are not limited to the type of CPE or device used to access the networks 205, 210, 230, and 235.

The VPG 200 and/or the service provider core network 205 may further provide such functionality as routing communication traffic from one or more of the user devices 220 and 225 to a null route if, for example, such user devices cannot be properly authenticated and/or communication traffic violates one or more policies and/or stateful session rules. The stateful processing system 240 may provide communication traffic processing of communication sessions allowing policies to be applied and implemented at the session level.

Although FIG. 2 illustrates an exemplary communication network, it will be understood that the present invention is not limited to such configurations, but is intended to encompass any configuration capable of carrying out the operations described herein.

Computer program code for carrying out operations of VPG devices 200 and communication networks discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments are described hereinafter with reference to flowchart and/or block diagram illustrations of methods, systems, apparatus, and/or computer program products. These flowchart and/or block diagrams further illustrate exemplary operations of managing communication traffic between one or more user devices and a secure network(s) in accordance with various embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
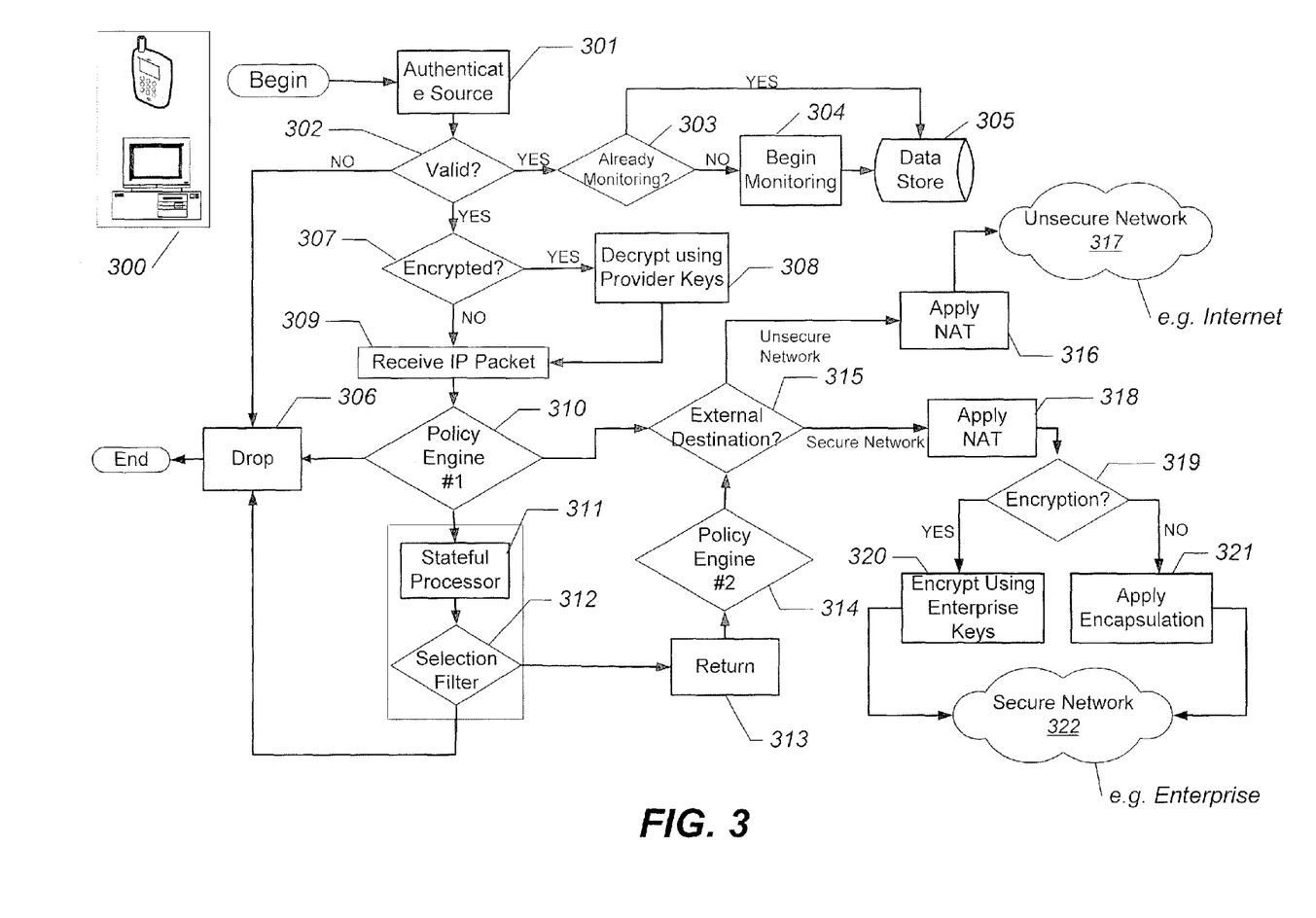
FIGS. 3 and 4 are flowcharts that illustrate operations of methods, systems, and computer program for managing communication traffic between user devices and a secure network using a VPG device in accordance with some embodiments.

Operations for managing communication traffic between user devices and a secure network(s) using a VPG device, in accordance with some embodiments, will now be described with reference to the flowchart of FIG. 3 and the communication network diagram of FIG. 2. Referring now to FIG. 3, operations for managing traffic sent from one or more user devices begin at block 300 where the user devices provide communication traffic to the VPG device 200. The VPG device 200 authenticates the source of the communication traffic at block 301. If the traffic is coming from a valid source as determined at block 302, then the VPG device 200 determines if the traffic is already being monitored for this source at block 303. If so, then data associated with the traffic continues to be stored in the data store 305. If not, then monitoring is initiated at block 304.

If, however, the traffic source is determined to be invalid at block 302, e.g., the source or communication traffic violates a policy being implemented by the VPG device 200 on behalf of for example, a secure network, then the communication traffic is dropped at block 306. If the traffic source is valid, then a determination is made at block 307 whether the traffic is encrypted. If so, then the communication traffic is decrypted at block 308 using encryption keys, for example, that are associated with the service provider that operates the VPG device 200 in the service provider core network 205.

Operations continue at block 309 where the IP packets are received. One or more policies are applied to the IP packets at block 310. Such policies, for example, may be security policies and may be defined by a secure network that has contracted with the service provider to provide the VPG device 200 functionality or may be global policies that are applied by the service provider. The policy engine at block 310 may determine whether to route the communication traffic to an external destination or whether the communication traffic is part of a session. If the communication is part of a session, then the traffic is provided to a stateful processor at block 311 for session level processing. At block 312, session rules may be validated so as to filter out traffic that doesn't belong to the session or violates one or more session rules. After stateful processing, the traffic may be returned at block 313 for a second application of policies at block 314, such as application of policies at the layer three (network layer) and/or layer four (transport layer) levels.

Operations continue at block 315 where traffic output from the policy engines at blocks 310 and 314 is evaluated to determine whether the traffic is destined for the secure network 322 associated, for example, with an enterprise or an unsecure network, e.g., the Internet at large. If the traffic is destined for the unsecure network, then NAT processing is performed at block 316 and the traffic is provided to the unsecure network at block 317.

If the traffic is destined for the secure network, then NAT processing is performed at block 318 and a determination is made at block 319 whether to perform encryption on the communication traffic. If so, then the traffic is encrypted using encryption keys, for example, that are associated with the secure network at block 320 and the traffic is provided to the secure network at block 322. If encryption is not to be performed, then the traffic is encapsulated at block 321 using, for example, the Multi-Protocol Label Switching (MPLS) protocol, the Virtual Private LAN Service (VPLS) protocol, or any other suitable encapsulation protocol. In general, the VPG device 200 may use any communication protocol or technique agreed upon between the VPG device 200 and the secure network. After encapsulation, the communication traffic is provided to the secure network at block 322.

Figure 4:
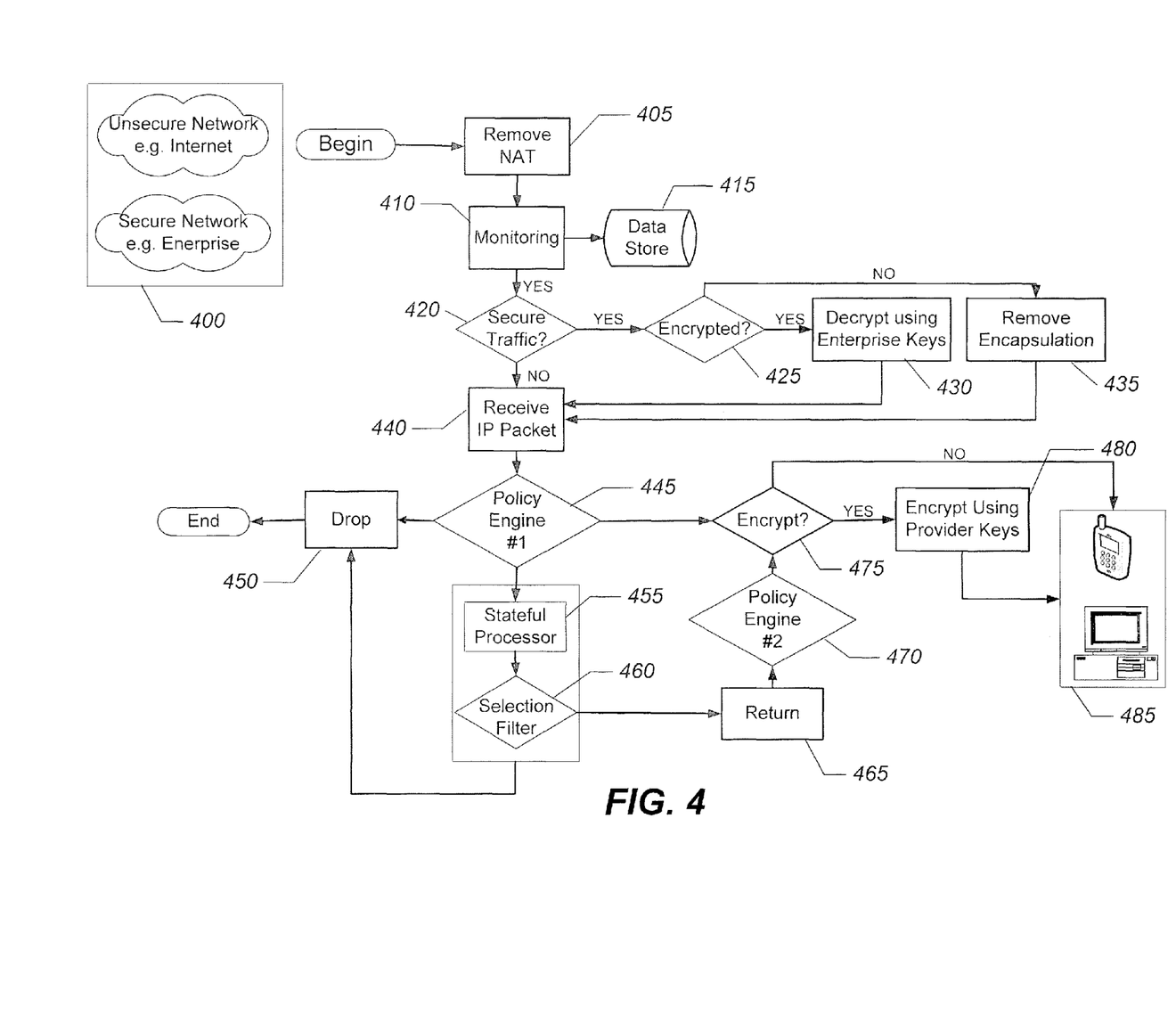

Further embodiments for routing communication traffic from the secure network 230 and/or the unsecure network 235 back to one or more user devices using a VPG device 200 are illustrated in FIG. 4. Operations begin at block 400 where traffic is provided from the secure network 230 and/or the unsecure network 235 destined for one or more user devices. At block 405, the VPG device 200 removes the NAT address mapping and monitors the traffic at block 410 by storing data associated therewith in the data store 415. If session policies need to be applied, validity checking may be performed, to ensure that session rules are not violated.

A determination is made at block 420 whether the traffic is secure. If so, then a second determination is made at block 425 whether traffic is encrypted. If so, then the traffic is decrypted at block 430 using encryption keys associated with the secure network. If the traffic is not encrypted, then the encapsulation is removed at block 435.

Operations continue at block 440 where the IP packets are received and one or more policies are applied thereto at block 445. The policy engine at block 445 may determine whether the communication traffic is part of a session. If the communication is part of a session, then the traffic is provided to a stateful processor at block 455 for session level processing. At block 460, session rules may be validated so as to filter out traffic that doesn't belong to the session or violates one or more session rules. After stateful processing, the traffic may be returned at block 465 for a second application of policies at block 470, such as application of policies at the layer three (network layer) and/or layer four (transport layer) levels.

Operations continue at block 475 where a determination is made whether to encrypt the communication traffic. If so, then the communication traffic is encrypted at block 480 using encryption keys, for example, that are associated with the service provider that operates the VPG device 200 in the service provider core network 205. Communication traffic is then provided to the one or more user devices at block 485.

FIGS. 3 and 4 illustrate operations for managing communication traffic between one or more user devices and both secure networks associated with an enterprise network for example, and unsecure networks, such as the Internet, using VPG device in a service provider network. In some embodiments, the VPG device may be operated by a third party service provider to serve enterprise customers in managing communication traffic to and from their secure network. The VPG device may effectively interface two different secure or cryptographic systems: 1) the cryptosystem securing the communications between user devices, e.g., mobile workers, and the like and the service provider and 2) the cryptosystem securing the traffic between the service provider and the secure network, such as a network enterprise. Traffic that is not destined to the secure network may be siphoned off and routed to its destination without passing through the secure network, thereby relieving the secure network of the burden of processing traffic not destined for the secure network. The secure network may also define one or more traffic policies, which may then be implemented by the service provider on behalf of the secure network, that affect the routing and handling of incoming traffic to the secure network. This may allow the secure network to place limitations on individuals and/or devices regarding which resources they may access within the secure network without the burden of developing and maintaining an infrastructure to enforce such safeguards.

The flowcharts of FIGS. 3 and 4 illustrate the architecture, functionality, and operations of embodiments of methods, systems, and/or computer program products for managing communication traffic between user devices and a secure network (s). In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of operating a communication network, comprising:
  receiving traffic from a user device at a gateway device associated with a gateway service provider;
  applying a traffic policy to the traffic at the gateway device, the traffic policy being associated with a secure network;
  determining if the traffic is destined for the secure network;
  routing the traffic to the secure network using a security protocol associated with the secure network responsive to determining that the traffic is destined for the secure network;
  decrypting the traffic responsive to receiving the traffic using a first cryptographic technique;
  encrypting the traffic using a second cryptographic technique different than the first cryptographic technique; and
  routing the traffic to an unsecure network without passing through the secure network responsive to determining that the traffic is not destined for the secure network;
  wherein the traffic encrypted using the first cryptographic technique cannot be decrypted using the second cryptographic technique;
  wherein the secure network and the unsecure network are distinct physical networks separated from each other; and
  wherein the user device is not part of the secure network and not part of the unsecure network.

2. The method of claim 1, further comprising:
  wherein routing the traffic to the secure network comprises encapsulating the traffic.

3. The method of claim 2, wherein the first cryptographic technique is public-key decryption using keys associated with the gateway service provider.

4. The method of claim 1, wherein the traffic policy comprises a security policy.

5. The method of claim 1, further comprising:
  assembling packets comprising the traffic into a session; and
  applying a session policy to the assembled packets, the session policy being associated with an application layer protocol level.

6. The method of claim 1, further comprising:
  receiving traffic destined for the user device at the gateway device;
  determining if the traffic destined for the user device is secure traffic;
  removing security from the traffic destined for the user device responsive to determining that the traffic destined for the user device is secure;
  applying a traffic policy to the traffic destined for the user device at the gateway device; and
  routing the traffic destined for the user device to the user device using a security protocol associated with the user device.

7. The method of claim 6, wherein removing security from the traffic destined for the user device comprises:
  determining if the traffic destined for the user device is encrypted; and
  decrypting the received traffic destined for the user device via public key encryption using keys associated with the secure network responsive to determining that the traffic destined for the user device is encrypted.

8. The method of claim 7, wherein removing security from the traffic destined for the user device comprises:

removing encapsulation from the traffic destined for the user device responsive to determining that the traffic destined for the user device is not encrypted.

9. The method of claim 6, further comprising:

assembling packets comprising the traffic destined for the user device into a session; and applying a session policy to the assembled packets, the session policy being associated with the application layer protocol level.

10. The method of claim 6, wherein the security protocol associated with the user device is public key encryption using keys associated with the gateway service provider.

11. A computer program product for operating a communication network, comprising:

a non-transitory computer readable storage medium having computer readable program code embodied therein, the computer readable program code when executed by a processor causing the processor to perform operations comprising:

receiving traffic from a user device at a gateway device associated with a gateway service provider;

applying a traffic policy to the traffic at the gateway device, the traffic policy being associated with a secure network;

determining if the traffic is destined for the secure network;

routing the traffic to the secure network using a security protocol associated with the secure network responsive to determining that the traffic is destined for the secure network;

decrypting the traffic responsive to receiving the traffic using a first cryptographic technique;

encrypting the traffic using a second cryptographic technique different than the first cryptographic technique; and routing the traffic to an unsecure network without passing through the secure network responsive to determining that the traffic is not destined for the secure network;

wherein the traffic encrypted using the first cryptographic technique cannot be decrypted using the second cryptographic technique;

wherein the secure network and the unsecure network are distinct physical networks separated from each other; and wherein the user device is not part of the secure network and not part of the unsecure network.

12. A switching apparatus, comprising:

a processor; and a memory coupled to the processor and comprising computer readable program code that when executed by the processor causes the processor to perform operations comprising:

receiving traffic from a user device at a gateway device associated with a gateway service provider;

applying a traffic policy to the traffic at the gateway device, the traffic policy being associated with a secure network;

determining if the traffic is destined for the secure network;

routing the traffic to the secure network using a security protocol associated with the secure network responsive to determining that the traffic is destined for the secure network;

decrypting the traffic responsive to receiving the traffic using a first cryptographic technique;

encrypting the traffic using a second cryptographic technique different than the first cryptographic technique; and routing the traffic to an unsecure network without passing through the secure network responsive to determining that the traffic is not destined for the secure network;

wherein the traffic encrypted using the first cryptographic technique cannot be decrypted using the second cryptographic technique;

wherein the secure network and the unsecure network are distinct physical networks separated from each other; and wherein the user device is not part of the secure network and not part of the unsecure network.

13. The switching apparatus of claim 12, wherein routing the traffic to the secure network comprises encapsulating the traffic.

14. The switching apparatus of claim 12, wherein the operations further comprise:

assembling packets comprising the traffic into a session; and applying a session policy to the assembled packets, the session policy being associated with the application layer protocol level.

15. The switching apparatus of claim 12, wherein the operations further comprise:

receiving traffic destined for the user device at the gateway device;

determining if the traffic destined for the user device is secure traffic;

removing security from the traffic destined for the user device responsive to determining that the traffic destined for the user device is secure;

applying a traffic policy to the traffic destined for the user device at the gateway device; and routing the traffic destined for the user device to the user device using a security protocol associated with the user device.

\* \* \* \* \*